United States Patent [19]

Hnizdor

[11] Patent Number: 5,775,024
[45] Date of Patent: Jul. 7, 1998

[54] POPPING HEAD ATTACHMENT FOR ARTIFICIAL FLY

[76] Inventor: Thomas A. Hnizdor, 9164 Brady, Redford, Mich. 48239

[21] Appl. No.: 811,914

[22] Filed: Mar. 5, 1997

Related U.S. Application Data

[63] Continuation of Ser. No. 611,284, Mar. 6, 1996, abandoned, which is a continuation of Ser. No. 330,007, Oct. 27, 1994, abandoned.

[51] Int. Cl.$^6$ ............................................. A01K 85/00
[52] U.S. Cl. .................. 43/42.37; 43/42.31; 43/42.25; 43/42.38
[58] Field of Search ........................ 43/42.37, 42.38, 43/42.31, 42.25, 42.1, 42.47

[56] References Cited

U.S. PATENT DOCUMENTS

| | | | |
|---|---|---|---|
| 1,323,458 | 12/1919 | Dills. | |
| 2,155,335 | 4/1939 | Sleeper et al. | 43/42.09 |
| 2,166,585 | 7/1939 | Evans | 43/42.25 |
| 2,231,507 | 2/1941 | Richards | 43/42.37 |
| 2,231,949 | 2/1941 | Rinehart. | |
| 2,235,331 | 3/1941 | Pugh | 43/42.37 |
| 2,754,612 | 7/1956 | Means. | |
| 2,771,704 | 11/1956 | Biggs | 43/57.1 |
| 3,032,911 | 5/1962 | Wilhelmi | 43/42.37 |
| 3,066,434 | 12/1962 | Duller | 43/42.38 |
| 3,121,291 | 2/1964 | Iffland | 43/42.37 |
| 3,121,969 | 2/1964 | Cuttino | 43/42.25 |
| 3,163,958 | 1/1965 | Quinn | 43/42.38 |
| 3,177,605 | 4/1965 | Segal | 43/42.37 |
| 3,205,609 | 9/1965 | Knapton | 43/42.38 |
| 3,483,651 | 12/1969 | Borger. | |
| 4,437,257 | 3/1984 | Keuge. | |
| 4,790,101 | 12/1988 | Craddock | 43/42.37 |
| 4,930,249 | 6/1990 | Johns | 43/42.37 |
| 5,386,658 | 2/1995 | Ferguson | 43/42.37 |

OTHER PUBLICATIONS

Thomas Hnizdor, Swimsuit, Flies & More, Aug. 1994, pp. 1–12.

*Primary Examiner*—Kurt Rowan
*Attorney, Agent, or Firm*—Young & Basile, PC

[57] ABSTRACT

A disk-shaped attachment mountable over the eye of the shank of a fishhook mounted to an artificial fly/lure body forms a water flow impact and sound generating surface which generates sound and irregular movements of the fly/lure during movement in the water. The disk-shaped attachment is preferably planar and includes an aperture for removable mounting over the eye of the shank of the fishhook. The disk-shaped attachment is preferably formed of a flexible material, with a transparent, flexible material being preferred.

12 Claims, 2 Drawing Sheets

POPPING HEAD ATTACHMENT FOR ARTIFICIAL FLY

This application is a CONTINUATION of application Ser. No. 08/611,284, filed on Mar. 6, 1996, now abandoned which is a CONTINUATION of application Ser. No. 08/330,007, filed on Oct. 27, 1994, now abandoned.

FIELD OF THE INVENTION

The present invention relates, in general, to artificial flies and lures used in fishing.

BACKGROUND OF THE INVENTION

Artificial flies and lures are widely used in the sport of fishing as they have proven to be excellent attractors and bait fish imitators for most varieties of fish. In the case of artificial flies, a fly simulating a natural fly, insect or small bait fish is mounted on a hook. Such flies may comprise a buoyant body, feathers, etc.

Due to the light weight of such flies, particularly since the flies are small and usually formed of buoyant materials, the artificial flies typically float on the water surface or at most one to two inches below the surface depending upon the water current. Any movement of the fly to simulate the natural actions of flies or insects in the water is caused solely by the stripping action employed by the fisherman or the fishing line.

It is known to form artificial flies and/or lures with fins simulating the pectoral fins on small bait fish. However, such fins have been typically formed of feathers or other lightweight, flexible elements and serve only to simulate a naturally occurring small bait fish rather than performing any useful function in controlling the movement of the artificial fly in the water.

So-called "poppers", as shown in FIG. 1, have also been devised to generate sounds, such as popping sounds, during movement of the fly in the water. Poppers typically are formed of a buoyant body mounted on the shank of a fishhook, with a generally concave front surface, a blunt front surface or an angle concave or blunt front surface formed on the body just behind the eye of the hook. As the fly is drawn through the water or as water flows past the fly, air entrained in the water impacts against the front surface of the buoyant body generating popping sounds which are believed to be useful in attracting fish.

While "poppers" are the only type of fly believed to be capable of generating sounds when drawn through the water, as shown in FIG. 1, such "poppers" have a rather unique shape which is completely dissimilar to any naturally occurring fly or bait fish.

Thus, it would be desirable to provide an attachment for conventional artificial flies or lures which is capable of generating sounds as the fly or lure is drawn through the water. It would also be desirable to provide such an attachment which also causes irregular movements of the fly or lure in the water, including a movement of the fly out of the water as well as pushing water ahead of the fly as it exits the water. It would also be desirable to provide such an attachment which is responsive to a fisherman's movements in stripping a fishline.

SUMMARY OF THE INVENTION

The present invention is a popping head attachment for an artificial fly or lure which is capable of generating sounds as well as irregular movements as the fly or lure moves through the water.

The attachment is in the form of means, mountable on a fishhook adjacent to the eye of the hook and ahead of the fly body, which forms a water flow impact and sound generating surface at the head end of the fly. In a preferred embodiment, the water flow impact and sound generating surface forming means is in the form of a disk-shaped member mounted over the eye and adjacent portion of the fishhook immediately in front of the buoyant body or other fly material mounted on the fishhook. Preferably, the disk-shaped member is releasably mountable over the eye so as to be used with any existing artificial fly or lure.

The disk-shaped member is preferably formed of a flexible material, such as a flexible plastic. It is preferred that the disk-shaped member also be formed of a transparent material so as to provide a pleasing appearance which does not detract from the attractor or imitator appearance of the fly or buoyant body mounted on the fishhook.

Finally, although the disk-shaped member is preferably generally planar in shape, other shapes, including concave members may also constitute the disk-shaped member or attachment of the present invention.

The popping disk attachment of the present invention can be mounted on existing artificial flies or lures to generates sounds, such as pops, gurgles, etc., as the fly is drawn in or moved by the fisherman. The attachment also causes irregular movement of the artificial fly or lure depending upon the speed and motion of stripping of the fishline by the fisherman. Depending on whether the fisherman executes a slow, long stripping action, a short, sharp, fast, jerky, stripping action, a medium fast stripping action or a long, fast, sharp, stripping action, the attachment when mounted on an artificial fly or lure, is capable of causing the fly to rise shortly below the surface of the water to create a V-shape wake on the water surface, generating various sounds, throwing water ahead of the fly above the surface of the water, as well as jumping completely out of the water. It is believed that all of these actions are more attractive to fish.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENT

Figure 1:
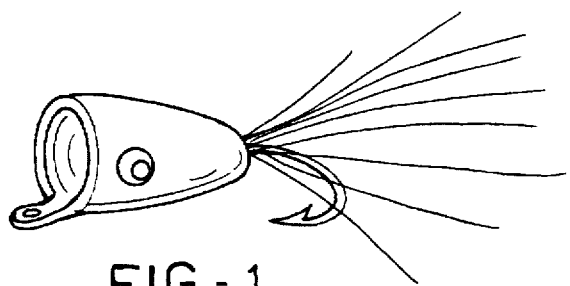
FIG. 1 is a perspective view of a prior art artificial fly commonly known as a "popper"
Figure 2:
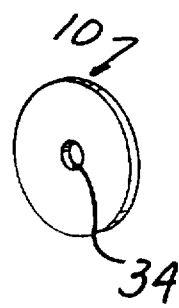
FIG. 2 is a perspective view of the popping head attachment of the present invention.
Figure 3:
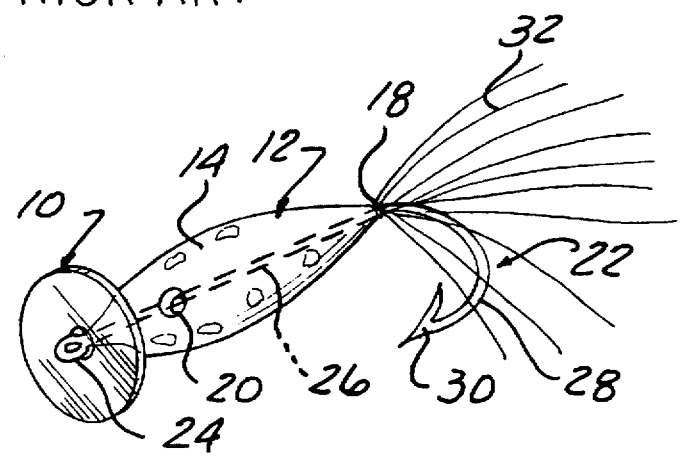
FIG. 3 is a perspective view of an artificial fly having the popping head attachment of the present invention mounted thereon.
Figure 4:
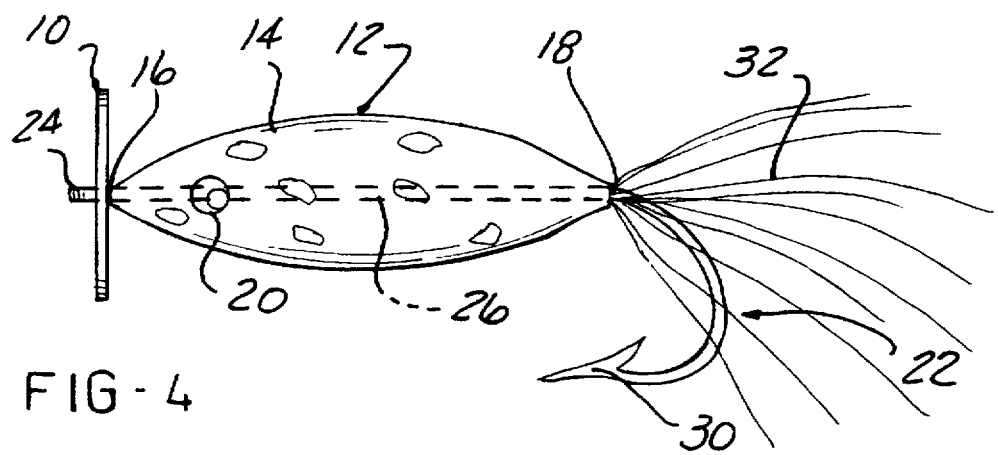
FIG. 4 is a side elevational view of the artificial fly and popping head attachment shown in FIG. 3.

Referring now to the drawings, and to FIGS. 2, 3 and 4 in particular, there is depicted a popping head attachment 10 which is mountable on any conventional artificial fly or lure 12 and which is capable of generating various sounds as well as creating various irregular movements of the artificial fly 12 as the artificial fly 12 is drawn through the water.

Throughout the following description, the term artificial fly and/or lure will be used to describe the advantageous use of the popping head attachment 10 of the present invention. It will be understood that the terms "artificial fly" or "artificial lure" are to be used interchangeably as the popping head attachment 10 of the present invention can be used with either or both flies or lures.

By way of background, the artificial fly 12 includes a fly element or body 14 which may have any suitable shape to simulate any naturally occurring insect, such as a fly, or a naturally occurring small bait fish. It will be understood that the particular shape of the fly element or body 14, shown in FIGS. 3 and 4, is by way of example only.

In the case of the fly element or body 14, the body 14 is formed of a suitable lightweight, buoyant material, such as polystyrene, balsawood, cork, etc. The body 14 has an aerodynamic or bullet shape with a front head end or nose 16, an opposed rear or tail end 18, and a smoothly shaped body formed therebetween. Various designs or patterns may be formed on the body 14 to simulate patterns found on naturally occurring bait fish or flies. Such patterns may include a pair of eyes 20 formed on the body 14 at a suitable location spaced from the front head end or nose 16. The body 14 may also be painted in any suitable color, such as a color or colors of a naturally occurring bait fish. Finally, as is conventional, an outer protective coating, such as a coating formed of an epoxy or lacquer, can be disposed over the entire exterior surface of the body 14.

A hook denoted generally by reference number 22 is disposed within and extends through the body 14 from the front head end or nose 16 to the rear or tail end 18. The hook 22 includes an eye 24 protruding outwardly from the front head end 16 of the body 14. An elongated, generally planar shank 26 extends from the eye 24 through the body 14 and outwardly from the rear or tail end 18 of the body 14. Any conventional bend 28 may be formed at the end of the shank 26. The bend 28 terminates in a point 30. It will be understood that the bend 28 and the point 30 may take the shape of any conventional bend and point typically found on fishhooks.

Finally, by way of example only, the artificial fly 12 is dressed with suitable tail feathers 32 which are attached to the rear or tail end 18 of the body 14 and extend outward from the body 14 covering an upper portion of the bend 28 of the fishhook 22, as shown in FIGS. 3 and 4.

Referring now to FIGS. 2, 3 and 4, there is depicted the popping head attachment 10 constructed in accordance with the teachings of the present invention. The popping head attachment 10, hereafter referred to simply as the attachment 10, provides a means for forming a water flow impact and sound generating surface ahead of the body 14 which causes irregular movement of the artificial fly 12 as well generating sounds as the fly 12 moves through the water, either under the influence of the water current or in response to a stripping action on a fishline 36 attached to the eye 24 of the fishhook 22.

The attachment 10 is in the form of a disk-shape member preferably having a generally circular shape, although other shapes, such as polygonal, etc., may also be employed. Although the diameter of the attachment 10 is preferably larger than the maximum O.D. of the body 14, the attachment 10 can also be smaller than or the same O.D. as that of the body 14.

The attachment 10 is formed of any material suitable for use in water, such as wood, coated metal, plastic, cork, etc. Preferably, however, a lightweight plastic is used to form the attachment 10. More preferably, the attachment 10 is formed of a flexible plastic. Further, the plastic is transparent so as not to detract from the appearance of the artificial fly 12 on which the attachment 10 is mounted.

The attachment 10 is extremely thin, such as 0.010 inches in thickness. An aperture 34 is formed centrally in the attachment 10 and is sized to pass over the eye 24 of the fishhook 22 and securely, yet removably mount on the front end portion of the shank 26 of the hook 22 immediately adjacent the front head end 16 of the body 14 of the artificial fly 12 as shown in FIGS. 3 and 4.

Finally, although the attachment 10 preferably has a planar form, the attachment 10 can also be shaped or preformed to have a slightly concave shape extending inwardly toward the body 14.

In use, the attachment 10 is snapped over the eye 24 of the hook 22 and abuts against the front head end 16 of the body 14 of the artificial fly 12. The central aperture 34 in the attachment 10 is slightly smaller than the maximum width of the eye 24 of the fishhook 12 such that the eye 24 securely retains the attachment 10 on the artificial fly 12, while still enabling its forced removal therefrom.

Due to the light weight of the attachment 10, the fly 12 with the attachment 10 mounted thereon can be cast in a normal manner. Once in the water, the attachment 10 is oriented generally perpendicular to the axis of the shank 26 of the fishhook shown in FIG. 5. When in the water, any air entrained in the water that strikes the attachment 10 will generate sounds, such as pops, gurgles, etc., which are believed to be useful in attracting fish to the artificial fly 12.

Figure 8:
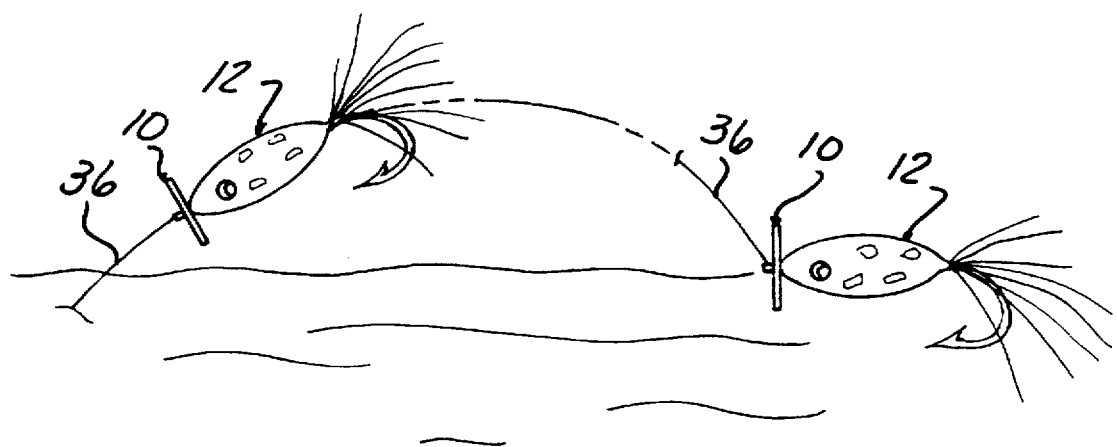
FIGS. 5–8 are pictorial representations of the use of the popping head attachment of the present invention causing different movements of the artificial fly in response to different stripping actions generated by a fisherman.
Figure 5:
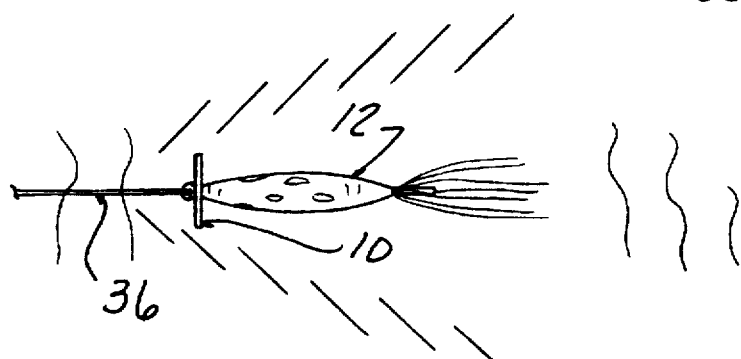
Figure 6:
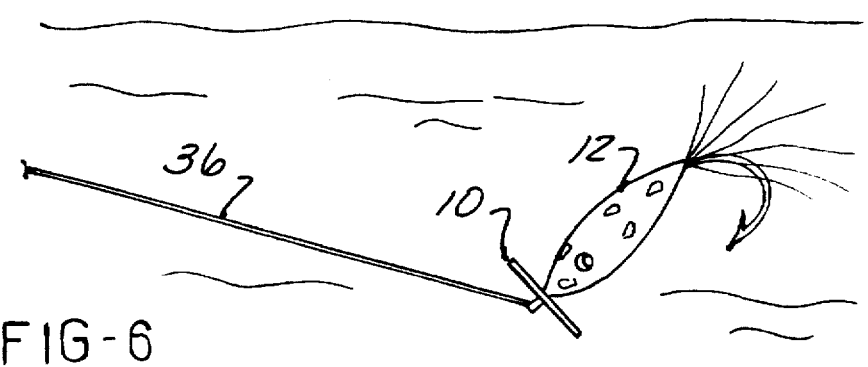
Figure 7:
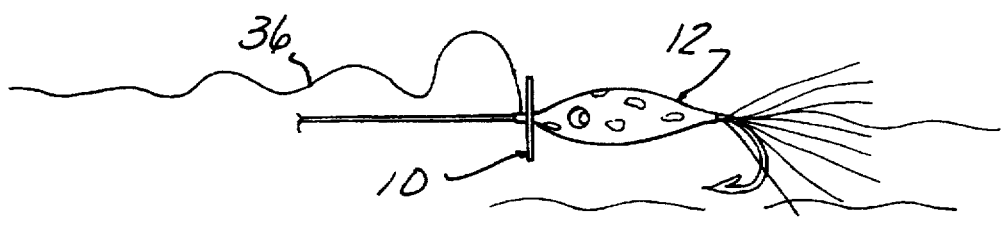

Depending upon the stripping action employed by a fisherman, the attachment 10 will cause the artificial fly 12 to exhibit various movements within and out of the water as well as creating sounds during such movements. For example, as shown in FIG. 5, during a slow, long, stripping action, the artificial fly 12 moves in a straight line a short distance below the water surface, such as 3–4 inches, while the attachment 10 creates a V-shaped surface wake. A short, sharp, fast jerking stripping action shown in FIG. 6 will cause the fly 12 to move quickly downward and then toward the fisherman in short distance spurts causing the attachment 10 to generate various sounds, such as pops, gurgles, etc., due to a collapsing air bubble or pocket formed behind the attachment 10 and over the fly 12. Repetitive short soft jerks or tugs will cause the fly to move along the water surface and the attachment 10 to push water ahead of the fly 12 up to six inches high as shown in FIG. 7. Harder jerks cause the attachment 10 to throw a stream of water above the water surface approximately 6 inches up and 6 inches ahead of the fly 12. Finally, a long, fast, sharp stripping action generated by a wrist flick will cause the fly 12 to jump out of the water approximately 10–12 inches above the water surface and move approximately 2–3 feet forward from its original position as also shown in FIG. 8.

In summary, there has been disclosed a unique popping head attachment which is easily mountable on any artificial fly or lure and which generates irregular movements as well as producing sounds during movement of the artificial fly through the water. The popping head attachment of the present invention simulates the noise generated by the well known "popper" fly; but with different movements of the fly in response to the type of stripping actions used by a fisherman. Finally, the present popping head attachment does not detract from the attractor appearance of an artificial fly or lure so as to enable the artificial fly or lure to continue to exhibit its attractor or imitator features.

What is claimed is:

1. An artificial fly comprising:

a fishhook having an eye at one end of a shank;

a body mounted on the shank and having a front end disposed in proximity to the eye of the shank, the body having an aerodynamic shape smoothly extending from a small diameter front end to a maximum diameter intermediate position and to a small diameter tail end; and a thin, flexible disk-shaped member having a thickness of substantially 0.010 inches releasably mounted on the shank between the eye and the front end of the body, the disk shaped member having a solid, substantially unbroken surface extending from a center mounted on the shank to a peripheral edge, the peripheral edge having no substantial circumferential discontinuity, the peripheral edge disposed at a distance from the center at least equal to a maximum diameter of the body to form a water flow impact and sound generating surface.

2. The artificial fly of claim 1 wherein:

the disk-shaped member is formed of a flexible plastic.

3. The artificial fly of claim 2 wherein:

the disk-shaped member is formed of a transparent material.

4. The artificial fly of claim 1 wherein:

the disk-shaped member has a circular shape.

5. The artificial fly of claim 1 wherein the disk-shaped member has an outer diameter greater than a maximum diameter of the body mounted in the fishhook.

6. The artificial fly of claim 1 wherein:

the disk-shaped attachment has a planar, circular shape formed of a flexible, transparent, plastic material.

7. A popping head attachment for use with an artificial fly having an aerodynamic body smoothly extending from a small diameter front end to a maximum diameter intermediate portion and to a small diameter tail end, the body mounted over the shank of a fishhook, the shank having an eye at one end, the attachment comprising:

a thin, flexible, disk-shaped member having a thickness of substantially 0.010 inches and a solid, substantially unbroken surface extending from a center to a peripheral edge, the peripheral edge having no substantial circumferential discontinuity, the peripheral edge disposed at a distance from the center at least equal to a diameter of a body mounted with the disk-shaped member on a fishhook to form a water impact and sound generating surface; and an aperture formed in the disk-shaped member permitting releasable mounting of the disk-shaped on a shank of a fishhook behind an eye of a shank and generally perpendicularly ahead of a front end of a body mounted on the shank.

8. The popping head attachment of claim 7 wherein:

the disk-shaped member is formed of a flexible plastic.

9. The popping head attachment of claim 7 wherein:

the disk-shaped member is formed of a transparent material.

10. The popping head attachment of claim 7 wherein:

the disk-shaped member is formed of a flexible, transparent, plastic material.

11. The popping head attachment of claim 7 wherein:

the disk-shaped member has an outer diameter greater than the maximum diameter of the body mounted on the shank.

12. The popping head attachment of claim 7 wherein:

the disk-shaped attachment has a planar, circular shape formed of a flexible, transparent, plastic material.

\* \* \* \* \*